United States Patent Office 3,545,835
Patented Dec. 8, 1970

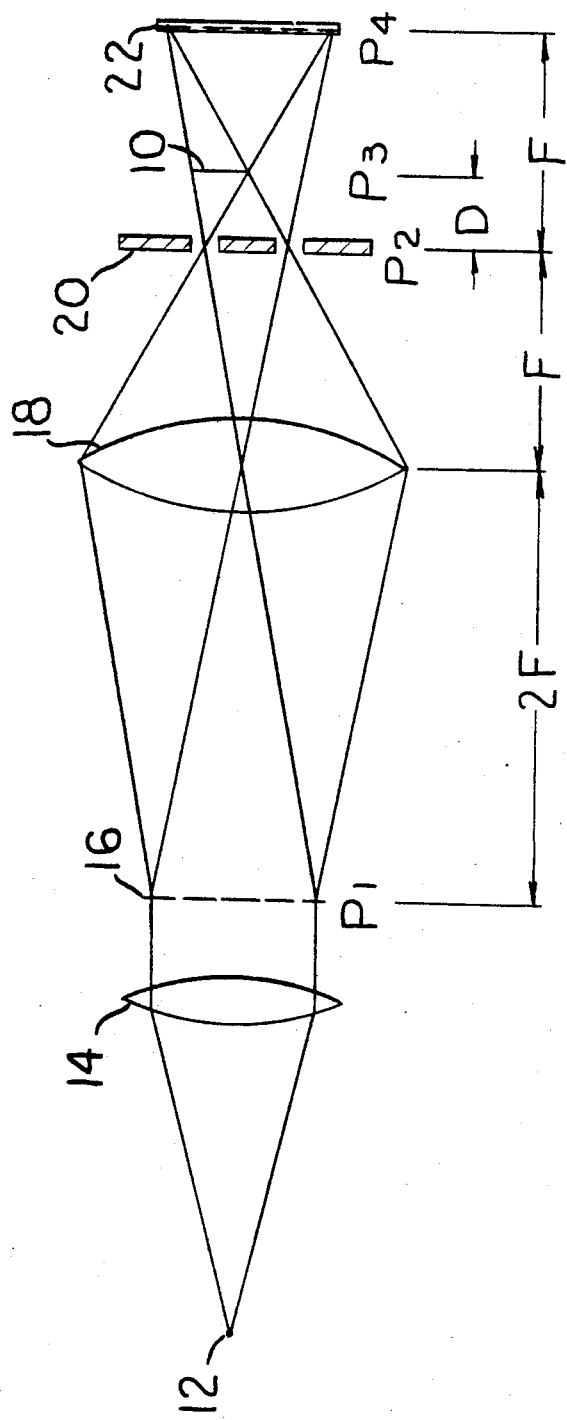

3,545,835
TWO-BEAM HOLOGRAPHY WITH REDUCED SOURCE COHERENCE REQUIREMENTS
Emmett N. Leith, Plymouth, and Juris Upatnieks, Ann Arbor, Mich., assignors to Holotron Corporation, Wilmington, Del., a corporation of Delaware
Filed May 16, 1967, Ser. No. 638,828
Int. Cl. G02b
U.S. Cl. 350—3.5   15 Claims

ABSTRACT OF THE DISCLOSURE

A method of making holograms of transparent objects with the two beam off-axis technique wherein the coherence requirement of the illuminating source is lessened, in one case even to that of the in-line holographic technique, by means of inserting a diffraction grating in the path of the parent illuminating beam to produce beams of diffracted orders. These beams are focused and filtered such that one diffracted order (object beam) is caused to pass through the transparent object and to a hologram plane positioned at the image plane of the diffraction grating and another (reference beam) passes directly to the hologram plane to produce an interference pattern whcih is recorded to produce a hologram. By deriving the object and the reference beam from diffracted orders of a parent source passed through a diffraction grating, and then recombining them at the hologram plane, the coherence requirement of the source is significantly reduced.

BACKGROUND OF THE INVENTION

Field of the invention

This invention relates to the field of holography and more specifically a means for reducing the coherence requirement of the illuminating source in the method of making off-axis holograms.

Description of the prior art

The science of holography obtained its initial impetus in 1948 when Gabor developed the technique of making in-line holograms. In this technique, a beam of coherent light was partially scattered by an object and the scattered radiation interfered with the background or unscattered radiation to produce an interference pattern which, when recorded, comprised a hologram. The hologram, when illuminated with coherent light, reproduced images of the object which were unseparated and therefore practically useless. Leith and Upatnieks then developed the two beam off-axis technique of making holograms in which the background radiation was replaced by a reference beam coherent with the object beam and which was directed to the hologram plane at an angle or "off-axis." In a hologram made according to this technique is illuminated with coherent light directed from the same position as the reference beam took during the construction of the hologram, separated images of the original object are produced. Since the reference beam is directed at an angle to the object beam a significantly higher number of fringes are produced at the hologram, thereby requiring greater resolution of the recording medium and a greater source coherence than that required by the in-line technique. The added source coherence requirement in off-axis holography has limited flexibility in choosing sources for making holograms and specifically has sometimes precluded the utilization of pulsed lasers and non-laser sources. The problem also precludes the utilization of high intensity sources since coherence of the source falls off as the intensity increases.

It is considered highly desirable to reduce the source coherence requirement in off-axis holography.

It is therefore an object of this invention to produce a method of making holograms whereby the coherence requirement of the source is lower than heretofore.

It is another object of this invention to decrease the source coherence requirement in making off-axis holograms to that required in the in-line holographic technique.

SUMMARY OF THE INVENTION

These objects are achieved in one form of off-axis holography through the utilization of a diffraction grating interposed in a beam of illuminating light. By focusing the diffracted orders to a spatial filter, which passes only two desired orders while blocking the remainder, and by positioning a transparent-type object in one of the unfiltered diffracted orders and utilizing the other unfiltered order as a reference beam to interfere with the beam passed through the object at a hologram plane positioned in the image plane of the diffraction grating, the coherence requirement of the parent source is lessened.

The subject matter regarded as this invention is particularly pointed out and distinctly claimed in the appended claims. The invention, however, both as to its mode of operation, together with further objects and advantages thereof, may best be understood with reference to the following description taken in connection with the accompanying drawing, in which:

BRIEF DESCRIPTION OF THE DRAWING

FIG. 1 illustrates diagrammatically the method of making off-axis holograms of transparent-type objects in which, according to this invention, the coherence requirement of the source is significantly reduced.

DETAILED DESCRIPTION OF THE PREFERRED EMBODIMENT

Qualitative discussion

Referring to FIG. 1, there is illustrated a method of making a hologram of an object 10, which may be transparent or may be a silhouette of an opaque object, since optical path length differences resulting from either type of object are minimal. That is to say, the object, when illuminated with a beam of radiation, affects the intensity thereof without affecting substantially its direction. The present invention, while not limited to transparent objects, inasmuch as silhouettes of objects are also applicable, will be described and claimed in terms of a transparent-type object for convenience sake. It should be understood, however, that the utilization of the term "transparent-type object" includes both transparent objects and silhouettes of objects.

In FIG. 1 a point source of electromagnetic radiation 12 is directed through a collimating lens 14 and thence through a diffraction grating 16 positioned at plane $P_1$ in space. The grating 16 diffracts the incident radiation into several diffracted orders which are gathered by a lens 18 positioned at twice its focal distance from the diffraction grating 16. It is entirely possible that the source 12 may comprise an electron beam source inasmuch as electrons, due to their wavelike properties, may be used to create interference patterns. In this case the object 10 must be transparent to electrons rather than light and the lens 18 must be an electron lens; however, in all other aspects the principles of the invention remain the same. Therefore in the description and claims, the terms electromagnetic radiation and transparent-type objects should be construed to include the electron beam situation.

Although a portion of the incident light on the diffraction grating 16 is not diffracted at an angle but rather is passed straight through, this radiation will, for purposes of description and the claims, be termed the zero order diffracted beam. In the embodiment disclosed in FIG. 1, only two beams of diffracted orders of radiation are depicted and it is intended that these two diffracted beams represent generally any two diffracted orders, including the zero order. As will be pointed out with respect to Table 1, various combinations of pairs of diffracted orders yield different results and therefore different coherence requirements of the source are dictated. However, the broad object of this invention, i.e. to reduce the coherence requirement of the source, is accomplished with the utilization of several different combinations of pairs of diffracted orders and therefore the invention will be described in FIG. 1 without reference to which the diffracted orders is utilized.

Since FIG. 1 is intended to be general in the sense that for purposes of this description the orders of diffracted light focused by the lens 18 are not specified, the source 12 is illustrated to lie on a line normal to the plane of the grating and the lens. However, in actual practice, for maximum utilization of the entire aperture of the lens, it may be desirable to direct the illuminating beam at angles to the grating, depending on which pair of diffracted orders is to be utilized. For instance, if one of the first orders and the zero order are to be utilized, the beam may be angularly directed such that the top half of the lens 18 collects the first order and the bottom half the zero order, thus utilizing the whole lens. The other first order beam not to be utilized will be diffracted at an angle so as to bypass the lens 18 and can easily be blocked out of the system.

Continuing on with the description of FIG. 1, a spatial filter 20 is inserted at the focal plane of the lens 18, termed plane $P_2$ in FIG. 1, and includes a pair of apertures or pinholes positioned to permit the passage of the two diffracted orders of light depicted. All of the other diffracted orders of light, not depicted in FIG. 1 for the sake of clarity, are blocked by the spatial filter 20. It will be apparent that the spatial filter 20 can be designed to pass any two desired orders of light therethrough.

The transparent-type object 10 is positioned in one of the beams of diffracted light (object beam) at a plane position $P_3$ and the other beam of diffracted light (reference beam) is directed past the object without passing therethrough. A compensating plate of equal thickness and index of refraction as the object may be inserted in the reference beam in order to equalize the path lengths of the two beams. This plate may not be necessary for thin objects and is not shown here for the sake of clarity. The two beams are directed to overlap at a position in space to produce an interference pattern which, when recorded, comprises a hologram. In accordance with this invention, a detector surface 22 is positioned at the image plane $P_4$ of the lens 18 and permanently records the interference pattern or hologram. By forming the hologram at the image plane $P_4$, the hologram merely comprises an image of the diffraction grating 16, the fringes of which have been modulated in accordance with the transparent-type object 10. Qualitatively, the coherence requirement of the source 12 would appear to be reduced; the interference fringes appearing at the image plane $P_4$ would be there regardless of the coherence of the source, inasmuch as these fringes are merely an image of the diffraction grating 16.

From this viewpoint it is apparent that formation of fringes at the hologram plane is unrelated to the coherence of the source. Of course, the coherence requirement of this source in off-axis holography is dictated by considerations other than the number of fringes produced. These other considerations involve the particular type of object being illuminated and relate to such things as the maximum scattering angle between the object and the ends of the hologram, the size of the hologram, and the off-axis angle of the reference beam.

The light rays from the parent source 12 are divided at the grating 16 so that one part of a light ray serves as a reference beam ray and another part serves as an object beam ray. These two rays are then recombined by the lens 18 at the plane $P_4$. Both the reference beam ray and the object beam ray will have traveled over an equal optical path length and thus will be in phase with each other at the plane $P_4$. By forming the hologram at the image plane $P_4$ of the grating 16 where the two light rays again come together, the requirement that the sources of the two beams be spatially coherent is fulfilled. Thus at any instant of time the apparent sources of the two beams are spatially coherent with each other, a feature enabling the utilization of sources such as pulsed lasers which heretofore had limited use in holography because of their relatively spatially incoherent beams. The temporal coherence requirement, i.e. the required narrowness of bandwidth of the illuminating source, is reduced by this invention below that required in conventional off-axis holography. To enable a comparison to be made between the temporal coherence requirements in conventional off-axis holography with that of the present invention, it would be helpful to derive a simplified expression for the coherence requirement of the source in conventional off-axis holography. In conventional off-axis holography, the temporal coherence requirement of the source may be expressed in terms of the maximum path length difference at the far edges of the hologram which, in terms of the height of the hologram $d$ and the angle that the reference beam makes from the normal to the hologram $\theta$, can be equated to $(\frac{1}{2})d \sin \theta$. For typical values of $d$ and $\theta$, the order of magnitude of the maximum path length difference or required coherence length may be around one centimeter for a transparent-type object. Converting this coherence requirement into terms of the source wavelength $\lambda$, by the factor $(\frac{1}{2})(\lambda^2/\Delta\lambda)$, the required bandwidth $\Delta\lambda$ for a 1 cm. coherence length turns out to be approximately 0.1 A. The impracticalities of a non-laser source, for example a mercury arc which has a $\Delta\lambda$ of from 25–100 A., are apparent.

Quantitative discussion

With this in mind, consider the following quantitative analysis in which a general expression will be derived for the $\Delta\lambda$ source requirement according to the present invention. After this expression is derived, typical numerical values will be substituted in the expression and the new $\Delta\lambda$ requirement will be compared with the requirement shown above in conventional off-axis holography.

The following quantitative analysis will be based upon the configuration shown in FIG. 1 and will assume an object 10 which operates upon an incident wave according to the function $e^{i\beta x_3}$ where $\beta$ is a constant and $x_3$ indicates linear dimensions in the plane $P_3$. Accordingly, linear dimensions in the other planes of FIG. 1 will be given corresponding subscript numbers and in the plane of the lens 18 will be given subscript letter $f$. Beginning with the wave incident upon the grating 16, the expression for the wavefront $V(t)$ is given by the following equation:

$$V(t) = \frac{1}{2\pi}\int_0^\infty v(\omega)e^{-i\omega t}d\omega \qquad (1)$$

where $\omega$ is the frequency of the illuminating beam in radians per second.

The diffraction grating 16 diffracts the incident wavefront into various diffracted orders according to an amplitude transmittance function which, eliminating all higher orders, may be expressed:

$$a_0 + a_1 \cos \alpha x_1 \qquad (2)$$

where $\alpha = 2\pi/P$ and $P$ is the period of the diffraction grating 16.

The wavelength $u_t$ at the plane of the lens 18 can now be expressed as follows:

$$u_t = \frac{i}{4\pi\lambda F} \int_0^\infty \int_{-\infty}^\infty \int_{-\infty}^\infty v(\omega)(a_0 + a_1 \cos \alpha x_1)$$
$$\exp -i\frac{\pi}{2\lambda F}\left[(x_t-x_1)^2 + (y_t-y_1)^2\right] e^{-i\omega t} dx_1 dy_1 d\omega \quad (3)$$

where
$\lambda$ is the wavelength of the incident light, and
F is the focal length of the lens.

The above expression is simply an application of the well known Fresnel-Kirchhoff diffraction equation. Again applying the Fresnel-Kirchhoff diffraction equation, the field existing at the plane $P_2$ is determined by the following expression:

$$u_2 = \frac{i}{\lambda F} \int_{-\infty}^\infty \int_{-\infty}^\infty u_t \exp i\frac{\pi}{\lambda F}(x_t^2 + y_t^2)$$
$$\exp -i\frac{\pi}{\lambda F}[(x_2-x_t)^2 + (y_2-y_t)^2] dx_t dy_t \quad (4)$$

where $$\exp i\frac{\pi}{\lambda F}(x_t^2 + y_t^2)$$

is a quadratic phase factor introduced by the lens and representing the lens phase retardation function.

While the limits of the integrals are plus and minus infinity in the above equations, it should be understood that limiting factors such as the lens aperture may put finite limits on the integrals; however, the general expressions including infinite limits are more susceptible to analysis and will be retained.

Substituting the expression for $u_t$ Equation 3 into Equation 4 and carrying out the integration over the field of the lens yields the following expression for the field $u_2$ at the plane $P_2$:

$$u_2 = C \int v(\omega) \exp i\frac{\pi}{\lambda F}(x_2^2 + y_2^2) \int\int a_0 \exp -i\frac{2\pi}{\lambda F}(x_2 x_1 + y_2 y_1)$$
$$+ \frac{a_1}{2} \exp -i\left[\frac{2\pi}{\lambda F}(x_2 x_1 + y_2 y_1) + \alpha x_1\right]$$
$$+ \frac{a_1}{2} \exp -i\left[\frac{2\pi}{\lambda F}(x_2 x_1 + y_2 y_1) - \alpha x_1\right] e^{-i\omega t} dx_1 dy_1 d\omega \quad (5)$$

which can be simplified to:

$$u_2 = C \int v(\omega) \exp i\frac{\pi}{\lambda F}(x_2^2 + y_2^2) \left[ a_0 \delta\left(\frac{2\pi}{\lambda F} x_2, \frac{2\pi}{\lambda F} y_2\right) \right.$$
$$+ \frac{a_1}{2} \delta\left(\alpha + \frac{2\pi}{\lambda F} x_2, \frac{2\pi}{\lambda F} y_2\right)$$
$$\left. + \frac{a_1}{2} \delta\left(\alpha - \frac{2\pi}{\lambda F} x_2, \frac{2\pi}{\lambda F} y_2\right) \right] e^{-i\omega t} d\omega \quad (6)$$

where various constants have been absorbed into C. The first $\delta$-function represents the zero-order diffracted wave, and the other two represent the two first orders.

In FIG. 1 the spatial filter 20 at plane $P_2$ passes only two of the diffracted orders of light incident thereon. While in the qualitative discussion of FIG. 1 it was mentioned that the two beams passed by the spatial filter 20 were any pair of diffracted orders, it is convenient in a quantitative analysis to restrict this pair of beams to two beams chosen from the zero order diffracted beam or either of the two first order diffracted beams. Thus in the above equations all expressions representing second orders have been dropped.

The focused orders of light passed by the spatial filter 20 can be considered original point sources of illumination directed to the hologram plane $P_4$. Thus the diffraction pattern at the hologram plane $P_4$ can be calculated, using the Fresnel-Kirchhoff diffraction equation, in a manner similar to the above equations. One of the beams acts as a reference beam $r$ and its wavefront at the hologram plane $P_4$ is given by the following expression:

$$r = C_1 \int v(\omega) \exp i\frac{\lambda \alpha_r^2 F}{4\pi} \exp -i\frac{\pi}{\lambda F}\left[\left(x_4 - \frac{\lambda \alpha_r F}{2\pi}\right)^2 + y_4^2\right] e^{-i\omega t} d\omega \quad (7)$$

where $\alpha_r$ may take on values of 0, $+\alpha$, or $-\alpha$, depending on whether the zero order or the plus or minus first order diffracted beams are utilized.

The other beam acts as an object beam and impinges upon the object 10 at plane $P_3$ with the following wavefront $s$:

$$s = C_2 \int v(\omega) \exp i\frac{\lambda \alpha_s^2 F}{4\pi} \exp -i\frac{\pi}{\lambda D}\left[\left(x_3 - \frac{\lambda \alpha_s F}{2\pi}\right)^2 + y_3^2\right] e^{-i\omega t} d\omega$$
$$= C_2 \int v(\omega) \exp i[k_1 - k_3(x_3 - k_2)^2 - y_3^2] d\omega \quad (8)$$

where $k_1 = \lambda \alpha_s F/4\pi$, $k_2 = \lambda \alpha_s F/2\pi$, and $k_3 = \pi/\lambda D$
$\alpha_s = 0, +\alpha, -\alpha$, and
D = the distance between the object and the plane $P_2$.

The object beam $s$ is operated on at the plane $P_3$ by the object according to a function determined by the particular type of object. Since the holographic transformation is linear, the operational function associated with the object may be characterized as a simple signal such as an impulse or a signal of constant spatial frequency. An impulse signal may be associated with a point scatterer object and a constant spatial frequency signal may be associated with a wedge that bends the incident wave such that it appears as if the object beam emanated from a point source displaced from its actual source in the plane $P_2$. Since an optical wedge type object lends itself to analysis better than the point scatterer, that type of object will be assumed in the following analysis. Thus the operational signal of the object 10 is $e^{i\beta x_3}$ and the expression of the wavefront emerging from the plane $P_3$ is the product of $s$ and the operational signal or:

$$se^{i\beta x_3} = C_2 \int v(\omega) \exp i[k_1 - k_3(x_3-k_2)^2 + \beta x_3 - k_3 y_3^2]$$
$$= C_2 \int v(\omega) \exp i\left\{k_1 - k_3\left[x_3 - \left(k_2 + \frac{\beta}{2k_3}\right)\right]^2 - k_3 y_3^2 \right.$$
$$\left. + k_2 \beta + \frac{\beta^2}{4k_3}\right\} e^{-i\omega t} d\omega \quad (9)$$

This wavefront, as mentioned above, appears as if it emanates from a virtual source displaced from the actual source in the plane $P_2$. The position of the aperture in plane $P_2$ through which the actual beam emerges is given by the constant $k_2$. The expression in Equation 9 comprises the wavefront pattern of a virtual source having a phase $$\theta = k_1 + k_2 \beta + \frac{\beta^2}{4k_3} \quad (10)$$

and located at $$x_2 = k_2 + \frac{\beta}{2k_3} \quad (11)$$

rather than at $k_2$ the actual source position.

The object beam $s_0$ at plane $P_4$ can therefore be expressed:

$$s_0 = C_2 \int v(\omega) \exp i\left(k_1 + k_2 \beta + \frac{\beta^2}{4k_3}\right) \exp -i\frac{\pi}{\lambda F}\left[x_4 - \left(k_2 + \frac{\beta}{2k_3}\right)\right]^2 e^{-i\omega t} d\omega \quad (12)$$

and the intensity due to the two beams is $$|r+s_0|^2 = (|C_1|^2+|C_2|^2)\int |v(\omega)|^2 d\omega + 2|C_1 C_2|\int |v(\omega)|^2$$
$$\cos\left\{k_1+k_2\beta+\frac{\beta^2}{4k_3}-\frac{\pi}{\lambda F}\left[x_4-\left(k_2+\frac{\beta}{2k_3}\right)\right]^2\right.$$
$$\left.-\frac{\lambda\alpha_r^2 F}{4\pi}+\frac{\pi}{\lambda F}\left(x_4-\frac{\lambda\alpha_r F}{2\pi}\right)^2\right\}d\omega \quad (13)$$

which reduces to $$|r+s_0|^2 = 2|C_3|^2\int |v(\omega)|^2\left\{b_0+b_1\cos\left[\left(\alpha_s-\alpha_r\right.\right.\right.$$
$$\left.\left.\left.+\frac{D}{F}\right)x_4+\frac{\lambda\beta}{2\pi}\left(1-\frac{D}{F}\right)\left(\alpha_s F+\frac{1}{2}\beta D\right)\right]\right\}d\omega \quad (14)$$

where $|C_3|^2$, $b_0$ and $b_1$ are real constants.

Upon inspection of the cosine term in Equation 14 it is apparent that the spatial frequency recorded at the hologram plane is independent of the wavelength $\lambda$ of the source, whereas the phase term, $\phi$, in Equation 14 is proportional to $\lambda$, i.e.

$$\phi = \frac{\lambda\beta}{2\pi}(1-D/F)(\alpha_s F+1/2\beta D)$$

Thus, if the source includes a broad spectrum of wavelengths, the contrast of the fringe pattern recorded at the hologram plane becomes reduced. If we assume that the maximum allowable change in phase of the spatial frequency recorded at the hologram plane for good holograms is $\pi/2$, we can compute the maximum allowable bandwidth of the source. In calculating this source we assume a uniform spectrum $|v(\omega)|^2$ and allow the width of the spectrum to extend from $\lambda-\Delta\lambda$ to $\lambda+\Delta\lambda$ such that the change in phase, $\phi(\lambda+\Delta\lambda)$ minus $\phi(\lambda)$, equals $\pi/2$. Thus, $$\left[(\lambda+\Delta\lambda)\frac{\beta}{2\pi}\left(1-\frac{D}{F}\right)\left(\alpha_s F+\frac{1}{2}\beta D\right)\right]$$
$$-\left[\frac{\lambda\beta}{2\pi}\left(1-\frac{D}{F}\right)\left(\alpha_s F+\frac{1}{2}\beta D\right)\right] = \pi/2 \quad (15)$$

expanding and canceling terms we have $$\frac{\Delta\lambda\beta}{2\pi}\left(1-\frac{D}{F}\right)\left(\alpha_s F+\frac{1}{2}\beta D\right) = \pi/2 \quad (16)$$

solving for $\Delta\lambda$ we have $$\Delta\lambda = \frac{2\pi^2}{2\beta(1-D/F)(\alpha_s F+\frac{1}{2}\beta D)} \quad (17)$$

which simplifies to $$\Delta\lambda = \frac{2\pi^2}{\beta^2 D(1-D/F)\left(\frac{2\alpha_s F}{\beta D}+1\right)} \quad (18)$$

Equation 18 is a general expression for the maximum allowable spread in wavelength of the source where the reference and object beams are chosen to be any two of the three diffracted orders 0, 1 and −1. Therefore, Equation 18 includes the case of in-line holography wherein the zero order diffracted beam comprises both the object and the reference beam. Additionally, this expression includes the in-line case where either of the first order diffracted beams is utilized as both the object and reference beam. It should be noted, however, that in the in-line cases, the operational signal associated with the object should be $1+\exp i\beta x_3$ rather than the expression given in the above analysis. However, this has been implicitly assumed in the above analysis and therefore the equation 18 remains generally valid.

A qualitative examination of the Equation 18 indicates that the maximum spectral bandwidth is dependent upon the spectral dispersion factor $\alpha_s$ of the object beam but not upon the spectral dispersion factor. $\alpha_r$ associated with the reference beam. Qualitatively, this implies that in the special case where the object beam is chosen to be the zero order diffracted beam (where $\alpha_s=0$) and the reference beam is chosen to be a first order diffracted beam, the maximum $\Delta\lambda$ is equivalent to that of in-line holography. If, however, the object beam is chosen to be either of the first order diffracted beams, the $\Delta\lambda$ will be reduced from that obtainable in in-line holography but, as will be shown hereinafter, is still better than that obtainable in the conventional method of off-axis holography.

Table 1 gives the maximum $\Delta\lambda$ or temporal source coherence requirements for various specific cases. Table 1 also gives the spatial carrier frequency or $(\alpha_s-\alpha_r)$ for the various cases.

TABLE 1.—TEMPORAL COHERENCE REQUIREMENTS AND SPATIAL CARRIER VALUES FOR VARIOUS ARRANGEMENTS

| Case | Order used for reference beam | Order used for object beam | Spatial carrier $(\alpha_s-\alpha_r)$ | $\Delta\lambda$ (Eq. 18) |
|---|---|---|---|---|
| 1 | 0 | 0 | 0 | $\Delta\lambda = \dfrac{2\pi^2}{D\beta^2\left(1-\dfrac{D}{F}\right)}$ |
| 2 | 1 | 0 | $-\alpha$ | Same as above. |
| 3 | 0 | 1 | $\alpha$ | $\Delta\lambda = \dfrac{2\pi^2}{D\beta^2\left(1-\dfrac{D}{F}\right)\left(1+\dfrac{2\alpha_s FF}{\beta D}\right)}$ |
| 4 | −1 | 1 | $2\alpha$ | Same as above. |
| 5 | 1 | 1 | 0 | Do |

From Table 1 it can be seen that only cases 2, 3, and 4 are forms of off-axis holography and only one of these three cases, i.e. case 2, results in a source coherence requirement as good as the in-line case 1. Substituting typical values; for example, $D=15$ centimeters, $F=30$ centimeters, $\alpha_s=200$ lines per millimeter, and $\beta=20$ lines per millimeter; $\Delta\lambda$ in cases 1 and 2 are of the order of 170 A. and in cases 3, 4, and 5 of the order of 4 A. It will be noted that even in cases 3, 4 and 5, the maximum $\Delta\lambda$ is considerably in excess of that in conventional off-axis holography.

Table 1 shows that the coherence requirement in case 2 is less by a factor of $(1+2\alpha_s F/\beta D)$ than case 4; however, in some instances it may be advantageous to employ the latter case. In case 4 both the object and the reference beams are derived from first order diffracted beams and thus are both dispersed into their spectral components. On the other hand, in case 2 the zero order beam is utilized and, being undiffracted, is not dispersed. If a polychromatic light source is utilized to produce the parent beam, such as a mercury arc, the light of the desired wavelength must be separated out by some means. In the case of the undispersed zero order, separation would probably be done with interference filters which attenuates substantially the light of selected wavelength. However, in case 4, where all of the light utilized is dispersed, wavelength section can be accomplished with spatial filters with no attenuation of the selected light. In cases where the intensity of the illumination must be conserved, case 4 may be preferable to case 2 even though the source coherence requirement is greater.

Although the invention has been described in various embodiments, the principles underlining the invention will suggest many modifications of these embodiments to those skilled in the art. Therefore, it is desired that the appended claims not be limited to the described embodiments but rather should cover all such modifications as fall within the spirit and scope of this invention.

What is claimed is:

1. In the 2-beam off-axis method of making holograms of transparent-type objects, the improvement whereby the coherence requirement of the source radiation utilized to produce the hologram is reduced comprising the steps of:
   directing a parent beam of electromagnetic radiation to a first surface in space,
   separating said parent beam into diffracted wavefronts at said first surface in space,
   passing a first of the diffracted wavefronts through a transparent-type object positioned at a third surface in space, and bypassing said object with a second diffracted wavefront, and
   producing an image of said first surface at a fourth surface in space with radiation from said first and said second diffracted wavefronts, said diffracted wavefronts also interfering to produce a hologram of said object at said fourth surface in space.

2. The method as defined in claim 1 wherein the step of separating the parent beam into diffracted wavefronts includes positioning a diffraction grating at said first surface, and which includes the additional step of blocking at a second surface in space all but at least two of the diffracted wavefronts, and further wherein said first of said diffracted wavefronts comprises an unblocked zero order diffracted beam and said second diffracted wavefront comprises an unblocked first order diffracted beam.

3. The method as defined in claim 1 wherein the step of separating the parent beam into diffracted wavefronts includes positioning a diffraction grating at said first surface, and which includes the additional step of blocking at a second surface in space all but at least two of the diffracted wavefronts, and further wherein said first diffracted wavefrfont comprises an unblocked first order diffracted beam and said second diffracted wavefront comprises an unblocked zero order diffracted beam.

4. The method as defined in claim 1 wherein the step of separating the parent beam into diffracted wavefronts includes positioning a diffraction grating at said first surface, and which includes the additional step of blocking at a second surface in space all but at least two of the diffracted wavefronts, and further wherein said first diffracted wavefront comprises an unblocked first order diffracted beam and said second diffracted wavefront comprises the other of the unblocked first order diffracted beams.

5. The method as defined in claim 1 wherein the parent beam of electromagnetic radiation comprises an electron beam.

6. The method as defined in claim 1 wherein the parent beam of electromagnetic radiation emanates from a mercury arc beam.

7. The method as defined in claim 1 wherein the parent beam of electromagnetic radiation emanates from a pulsed laser source.

8. In a system of making holograms of transparent-type objects with the 2-beam off-axis technique including a source of relatively coherent electromagnetic radiation, the improvement whereby the coherence requirement of the source is reduced including in combination:
   a diffraction grating positioned at a first position in space through which a parent beam of electromagnetic radiation from said source is directed,
   a focusing system positioned to gather the diffracted orders of electromagnetic radiation separated by said diffraction grating and to focus said orders to points at the focal plane of said focusing system,
   means to block all but two desired diffracted orders positioned at the focal plane of siad focusing system, the two unblocked orders being separated in space thereby appearing to emanate from two virtual point sources,
   means to position a transparent-type object so as to be intercepted by one of said unblocked diffracted orders but not intercepted by the other of said unblocked diffracted orders, and
   an interference pattern recording medium positioned at the image plane of said focusing system so that an image of said diffraction grating is produced on said recording medium and to record thereon the interference pattern produced between the two unblocked diffracted orders to produce a hologram.

9. The system according to claim 8 wherein the source of electromagnetic radiation comprises a source of electrons.

10. The system as defined in claim 8 wherein the source of electromagnetic radiation comprises a mercury arc.

11. The system as defined in claim 8 wherein the source of electromagnetic radiation comprises a pulsed laser.

12. The system as defined in claim 8 wherein said blocking means comprises a spatial filter.

13. The system as defined in claim 12 wherein said spatial filter is positioned to pass a zero order diffracted beam and a first order diffracted beam, said zero order beam passing through the transparent-type object while the first order beam bypasses the object.

14. The system as defined in claim 12 wherein said spatial filter has the characteristic of passing a first order diffracted beam and a zero order diffracted beam, said first order beam passing through the transparent-type object while the zero order beam bypasses the object.

15. The system as defined in claim 12 wherein said spatial filter has the characteristic of passing both first order diffracted beams, one of which passes through the transparent-type object and the other of which bypasses the transparent-type object.

References Cited

Haine et al., Journal of the Optical Society of America, vol. 42, No. 10, pp. 763–773 (October 1952).

Leith et al., Journal of the Optical Society of America, vol. 52, No. 10, pp. 1123–1130 (October 1962).

Brooks et al., Applied Physics Letters, vol. 7, No. 4, pp. 92–94 (August 1965).

Burch et al., "Holography With a Scatterplate as Beam Splitter and a Pulsed Ruby Laser as Light Source," Nature, pp. 1347–48 (December 1966).

DAVID SCHONBERG, Primary Examiner

R. L. SHERMAN, Assistant Examiner

UNITED STATES PATENT OFFICE
CERTIFICATE OF CORRECTION

Patent No. 3,545,835                    Dated    December 8, 1970

Inventor(s) Emmett N. Leith et al.

It is certified that error appears in the above-identified patent and that said Letters Patent are hereby corrected as shown below:

Column 9, line 59, "beam" should read -- source --. Column 10 line 11, "siad" should read -- said --.

Signed and sealed this 8th day of June 1971.

(SEAL)
Attest:

EDWARD M. FLETCHER, JR.              WILLIAM E. SCHUYLER, JR.
Attesting Officer                    Commissioner of Patents